United States Patent Office.

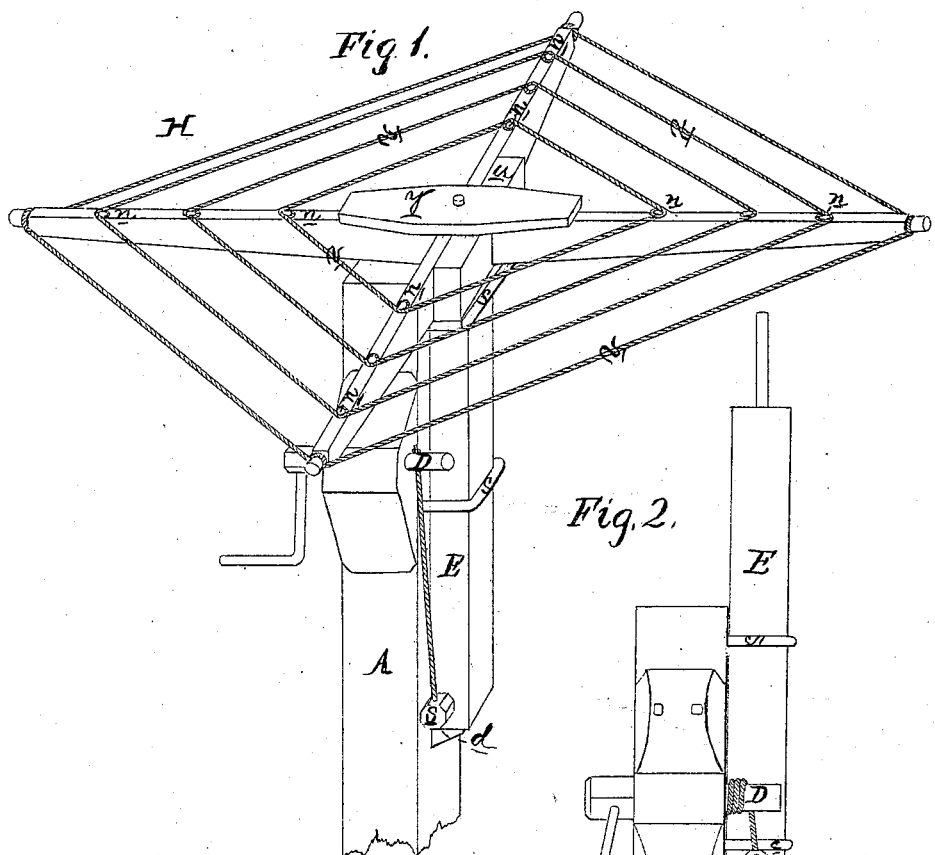
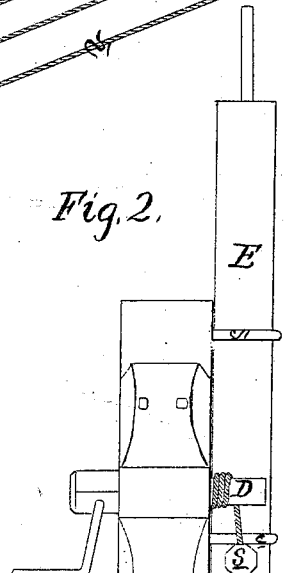
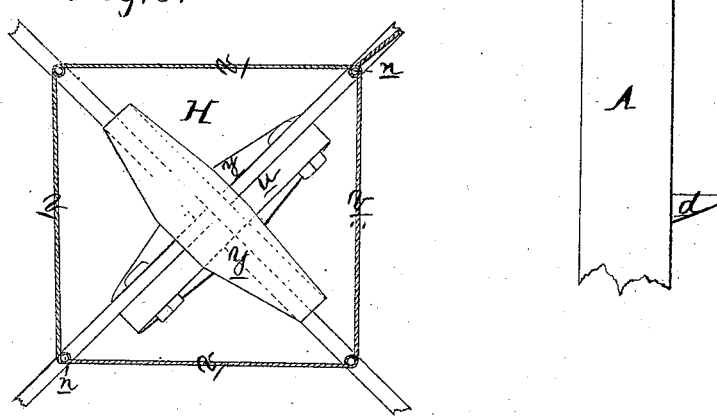

AMOS HORNOR, OF ROSS, INDIANA.

Letters Patent No. 93,620, dated August 10, 1869.

IMPROVEMENT IN CLOTHES-RACK AND DRIER.

The Schedule referred to in these Letters Patent and making part of the same.

*To all whom it may concern:*

Be it known that I, AMOS HORNOR, of Ross, in the county of Lake, and State of Indiana, have invented a new and valuable Improvement in Clothes-Reel and Drier; and I do hereby declare that the following is a full, clear, and exact description of the construction and operation of the same, reference being had to the annexed drawings, making a part of this specification, and to the letters and figures of reference marked thereon.

Figure 1, of the drawings, is a perspective view of my invention.

Figure 2 is a side view, showing the lifting-device.

Figure 3 is a top view, showing the manner in which the cross-pieces are laid, and the arms attached.

My invention relates to means for drying clothes; and

It consists mainly in the construction and novel arrangement of devices intended to serve an efficient purpose for the object named.

The letter A, of the drawings, represents a standard firmly attached to a platform, or fixed in the ground. This standard is provided with staples $c$ and pin $d$, to serve as guides and stop for the adjustable bar, hereinafter mentioned, and it has also on its side a windlass, marked D on the drawings.

The letter E represents an adjustable bar working up and down above the stop-pin $d$, and in the staples $c$, as shown. It is provided on one side, near its lower end, with a lifting-pin, $s$, to which the windlass-rope is attached.

The letter H represents my frame for holding the clothes. It consists of four arms arranged in the manner shown, upon the upper surface of which is a series of pins, $n$, the heads of which are adapted to receive and hold the cords $v$.

These arms are united at a common centre by means of suitable notches, and are braced and supported, respectively, by the caps $y$ and the side bars $u$, in the manner represented on the drawings.

In order to hold the sliding bar at any desired altitude, I make pin-holes through the same, and secure the object by passing a pin through any one of said holes above a staple, $c$.

The drying-frame is arranged to rotate upon a pivot-pin placed in the top of the bar E.

I am aware that clothes-driers, somewhat similar to mine in operation, have been made the subject of invention by other minds, but I am confident that the arrangement herein shown for adjusting the sliding bar E by the side of the main standard in staples, and bracing and supporting the arms of the frame by the means I employ, are original with myself.

What I claim as my invention, and desire to secure by Letters Patent, is—

The standards A and E, staples $c$, pins $n$, lugs $a$ and $s$, windlass D, frame H, bars $u$, caps $y$, and cords $v$ and $v'$, when constructed and arranged to operate as shown and described.

In testimony that I claim the above, I have hereunto subscribed my name, in the presence of two witnesses.

AMOS HORNOR.

Witnesses:
L. T. LOUKS,
W. J. BARRETT.